Feb. 12, 1952 O. W. ANDERSON 2,585,720

PUNCHING APPARATUS

Filed May 4, 1948 4 Sheets-Sheet 1

INVENTOR
OLIVER W. ANDERSON, DEC'D,
CARL HENDRICKSON, EXECUTOR
BY
Raymond W. Wotten
ATTORNEY.

Feb. 12, 1952 O. W. ANDERSON 2,585,720

PUNCHING APPARATUS

Filed May 4, 1948 4 Sheets-Sheet 2

INVENTOR
OLIVER W. ANDERSON, DEC'D,
CARL HENDRICKSON, EXECUTOR
BY
Raymond Whotton
ATTORNEY INVENTOR
OLIVER W. ANDERSON, DEC'D,
CARL HENDRICKSON, EXECUTOR
BY
Raymond W. Colton
ATTORNEY.

INVENTOR
OLIVER W. ANDERSON, DEC'D,
CARL HENDRICKSON, EXECUTOR
BY
Raymond W. Holton
ATTORNEY.

Patented Feb. 12, 1952 2,585,720

UNITED STATES PATENT OFFICE 2,585,720

PUNCHING APPARATUS

Oliver Wilbert Anderson, deceased, late of Cedar Rapids, Iowa, by Carl Hendrickson, executor, Cedar Rapids, Iowa, assignor, by decree of court, of one-third to Lucille M. Anderson, individually, and two-thirds to Lucille M. Anderson, as guardian Application May 4, 1948, Serial No. 24,998

21 Claims. (Cl. 164—113)

This invention relates to improvements in card punching apparatus, and particularly to equipment intended for edge notching cards or sheets.

Among the objects of the invention, it is proposed to provide a card notching apparatus comprising a card support, a plurality of groups of punches movable relative to the support, electromagnetic means sequentially activating the groups of punches, and driving means for imparting notching movement to selected punches of the sequentially activated groups. The individual punches of a group are likewise preferably selected electromagnetically, and indicating means associated with the selecting means serves to identify a selected group of punches. The invention also contemplates electromagnetic means for resetting the initial operating sequence of the groups of punches, and in conjunction with the electromagnetic selecting means for the punches, there may be provided switching means common to all of the selecting means.

It is contemplated that certain of the punches have a variable stroke, the extent of which may be determined by electromagnetic means, which means may assume the form of a plurality of electromagnets jointly controlling the stroke. The stroke variation may be effected through a punch actuating member having an adjustable stop, electromagnetic means for adjusting the position of the stop, and driving means cooperating with the actuating member for imparting notching movement to the punch.

The device of the present invention contemplates a keyboard having a plurality of punch selecting keys exceeding the number of punches in a group. According to one embodiment, each group contains three punches for producing notch patterns indicative of values ranging from 1 to 9 in unit increments; and an associated keyboard containing nine numeral keys representing values of from 1 to 9 permits selection of a desired pattern of these punches; a circuit controlling switch is operated by each of the keys; electromagnetic selector means for the punches is arranged in circuit with the switches to produce a punch pattern peculiar to each key; and driving means is provided to impart notching movement to the key-selected punches.

A plurality of such groups of punches will be sequentially activated by connecting the key controlled switches with one group after another. Accordingly, the invention includes key operated means for interconnecting the switches with the different groups of punches. The electromagnetic punch selectors for each group are sequentially arranged in circuit with the switches to produce a desired punch pattern at each card position, whereupon the notching movement is imparted to the group of selected punches prior to the activation of a succeeding group. The punch group selecting means may respond to the operation of each key on the keyboard. Upon depression of the numeral keys, the switches will close the proper electromagnetic circuits to produce the desired punch pattern, and upon release of the keys, a new group of selecting electromagnets will be included in circuit with the switches. In addition to the numeral keys, the keyboard provides a group selecting key and a reset key, each of which also operates a circuit controlling switch, and these switches are likewise connected to operate the punch group selecting means.

After a card has been properly positioned on the die plate of the present apparatus, it is unnecessary to shift the card with respect to its support until all desired notching has been accomplished, since a group of punches is provided for each position on the card, and it will be noted that after the desired key has been depressed for a particular position on the card, any notching for that position will be completed before selection of the pattern for a succeeding position.

Further objectives of this invention will become evident from a more detailed description based upon the accompanying drawings wherein.

Figures 1, 10:
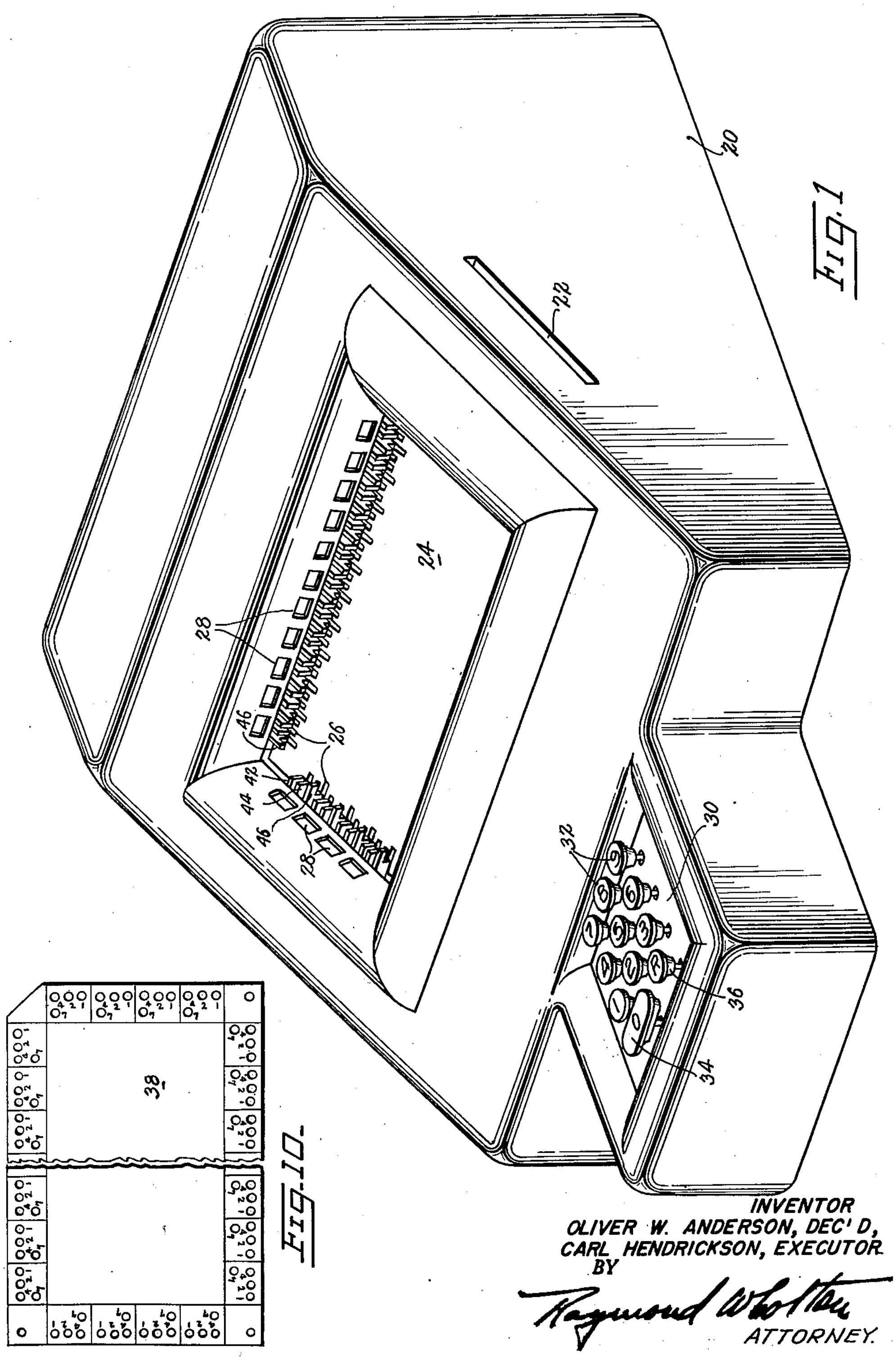
Fig. 1 is a perspective of an encased machine embodying the present invention.
Fig. 10 is a plan view of a commercial type of card for which the present device is adapted.

The machine shown in Fig. 1 is provided with a cover 20 having slots 22 in at least one of its side walls for the introduction and removal of cards to be notched. A card to be punched is supported on an inclined die plate 24 whose four edges are notched at 26 to complement punches 42, 44 and 46, pivotally supported thereabove to produce desired patterns of notches at the various card positions. Each group of three punches is provided with a signal lamp 27 arranged behind its respective window 28. A forwardly extending keyboard 30 is provided with numeral bearing keys 32 representing values of from 1 to 9 in increments of one, a zero or punch group selecting key 34 (marked "0") and a reset key 36 (marked "R") for reestablishing the initial predetermined sequence of activation of the punch groups.

Figure 2:
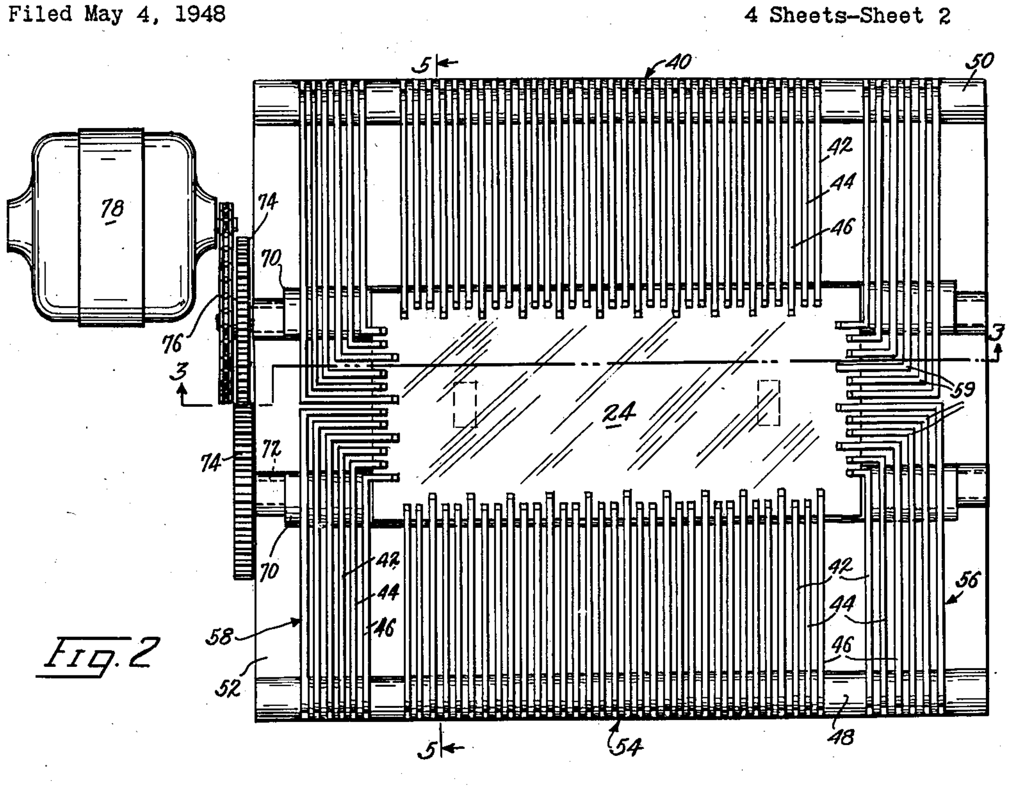
Fig. 2 is a plan view of the die plate and punch subassembly of the machine shown in Fig. 1.
Figure 3:
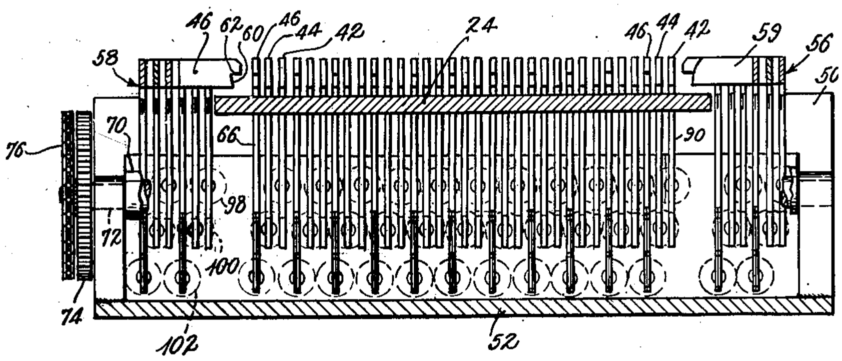
Fig. 3 is a section taken along line 3—3 of Fig. 2.
Figure 4:
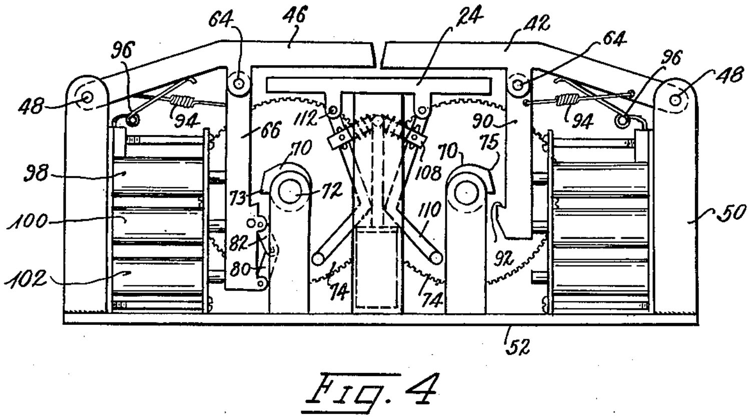
Fig. 4 is an elevation of the right end of Fig. 2.
Figure 5:
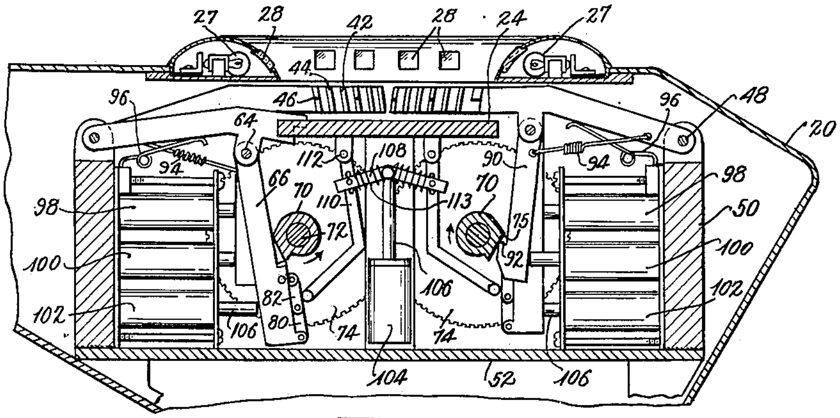
Fig. 5 is a section taken along line 5—5 of Fig. 2.
Figure 6:
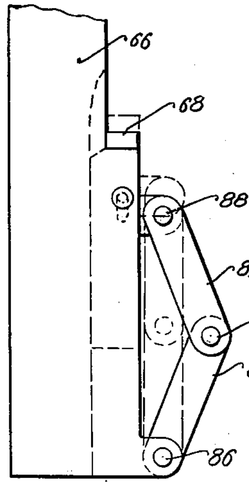
Fig. 6 is an enlarged fragmentary elevation depicting a detail of a variable throw actuator.
Figure 7:
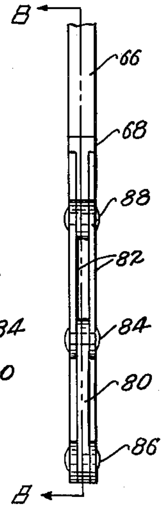
Fig. 7 is an elevation of the right end of Fig. 6.
Figure 8:
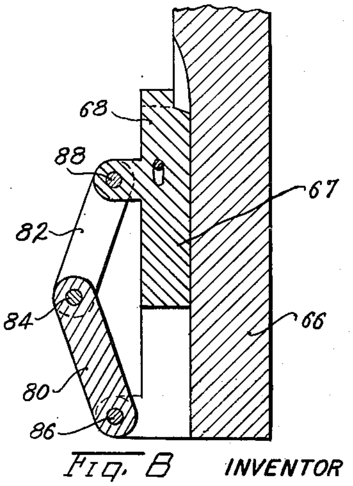
Fig. 8 is a sectional elevation taken along line 8—8 of Fig. 7.

As depicted in Figs. 2 and 3, each punch group is composed of three punches in an arrangement particularly adapted for use with a card 38 of the type shown in Fig. 10. To represent values from 1 to 9 at a given position on a card of this type, the notching will appear as follows:

| Value to be represented | Notch to perforation |
|---|---|
| 1 | 1 |
| 2 | 2 |
| 3 | 1 and 2 |
| 4 | 4 |
| 5 | 4 and 1 |
| 6 | 4 and 2 |
| 7 | 7 |
| 8 | 7 and 1 |
| 9 | 7 and 2 |

It will thus be apparent that with a card of this type where the "4" and "7" perforations are aligned normal to the edge, notches of greater depth are required to depict values exceeding 6.

Since all four edges of a card of this type are adapted to be notched, gangs of punches are appropriately disposed as depicted in Fig. 2. The gang 40 for the upper edge of the card comprises punches arranged in eleven groups of three each. A punch 42 of each group serves to notch the card to its "1" perforation. Similarly, a punch 44 of each group will notch to the perforation "2" at the corresponding position on the card. A variable stroke punch 46 of each group can be selectively activated to notch its position on the card either to the perforation "4" or to the perforation "7." The individual punches are supported for arcuate movement about a pivot member 48 carried by side walls 50 secured to a base 52.

The punches constituting the gang 54 for the lower edge of the card are arranged somewhat similarly to those for the upper edge and similar parts have been correspondingly identified. It will be noted that the order in which the punches are arranged is consistent with the arrangement of perforations of the card of Fig. 10.

The punches constituting the gangs 56 and 58 for notching the ends of the card are carried by arms containing bends 59, which arms are pivoted about the same members 48 as are the punches of the upper and lower edge gangs. This arrangement avoids obstructions at the ends of the die plate and makes it possible to introduce and remove cards to and from the die plate when the punches assume their normal elevated positions. It will be noted from Fig. 2 that half of the punches of each of the gangs 56 and 58 are pivoted in alignment with the gang 40 from the upper portion of the machine and the other half in alignment with the gang 54 from the lower portion. The individual punches of these end gangs have been identified, based upon the values they represent, similarly to those previously described with reference to the other gangs.

As will appear more clearly from Fig. 3 of the drawings, each of the variable stroke punches 46 has stepped notching portions, including a lower edge 60 which notches to the "4" perforation of a card upon partial depression of the punch, and an upper projecting portion 62 serving to notch the card to its "7" perforation when a longer stroke is imparted to the punch.

The actuating mechanism for the punches will appear from Figs. 4 to 8 inclusive wherein each of the variable stroke punches 46 provides a pivot 64 intermediate its length for articulation with a depending actuator 66 having an adjustable stop 68 for engagement with a driving cam 70 secured to a driving shaft 72. Each cam has a leading edge or toe 73 for imparting downward motion to an actuator in its path, and a trailing edge or heel 75 which tends to deflect the actuator from the path of the cam. There are two such driving shafts and cams, interconnected through gears 74 and driven through a chain and sprocket drive 76 by a motor 78. The lower end of each actuator 66 is slotted to receive a slide block 67 which carries the adjustable stop 68. A toggle connection is provided by a link 80 coupled with a pair of links 82 by a pivot 84, the lower link 80 being connected by a pivot 86 to the lower end of the actuator 66 and the upper end of the links 82 being connected by a pivot 88 with the slide block 67. The normal position of the adjustable stop 68 is that depicted by the full lines in Fig. 6, the broken lines of this figure serving to illustrate the elevated position of the stop when the toggle links are aligned. When the stop is in the lower position, which may be accomplished with the aid of suitable biasing springs, not shown, action of the cam 70 will move the punch 46 through only that portion of its stroke sufficient to notch a card to its "4" perforation. When the stop is in its upper position, engagement by the cam 70 will impart to the punch 46 an increased stroke, as has been depicted at the left side of Fig. 5, to notch a card to its more remote perforation "7." The punches 42 and 44 are similarly actuated, being provided with intermediate pivots 64 from which their actuators 90 depend for cooperation with the driving cams 70. Since the actuators 90 are provided with fixed stops 92, their punches will receive strokes of constant values.

Normally the actuators 66 and 90 are biased out of the paths of the cams 70 by means of springs 94 extending to their respective punch arms, which are in turn biased upwardly by means of springs 96 suitably bearing upon the machine frame, thus assuring clearance between the die plate and punches for introduction and removal of the cards.

The various actuators are interposed in the path of one or the other of the driving cams 70 by means of electromagnets. Each group of punches is provided with four such electromagnets, identified as 98, 100, 102 and 104 respectively, for controlling the pattern to be imparted to the three punches of each group. The electromagnet 98 actuates the punch having the value "1," the electromagnet 100 actuates the punch having the value "2," and the electromagnets 102 and 104 jointly control the variable stroke punch 46 which selectively notches the value "4" or "7." In the operation of the punches 42 and 44, when the armatures 106 of their respective electromagnets are projected, their actuators are moved into the path of one of the driving cams and the corresponding punches are depressed to notch a card resting on the die plate. When the punch 46 is to be operated to notch to the perforation "4," its actuator 66 will be advanced into the path of the driving cam 70 by projecting the armature of the electromagnet 102, at which time the adjustable stop 68 will be in its lowermost position. Where a longer stroke is to be imparted to the punch 46, the electromagnet 104 will likewise be energized, whereupon its armature 106 will be retracted to adjust the adjustable stop 68 to its elevated position. The upper end of the armature 106 of each electromagnet 104 is pivotally connected to a link 108 whose remote end is related in pin and slot connection with a link 110 which depends from a pivot 112 relating its upper end with the die plate 24, the lower end of the link 110 acting to align the toggle links 80 and 82 and thereby raise the adjustable stop to its uppermost position. A spring 113 carried by the link 108 between the armature 106 and link 110, urges the armature and link system to its original position upon deenergization of the magnet 104. Inasmuch as the electromagnet 104 serves only to change the stroke of the punch, it will be clear that the electromagnets 102 and 104 will be energized jointly where the punch 46 is to receive its increased stroke.

Figure 9:
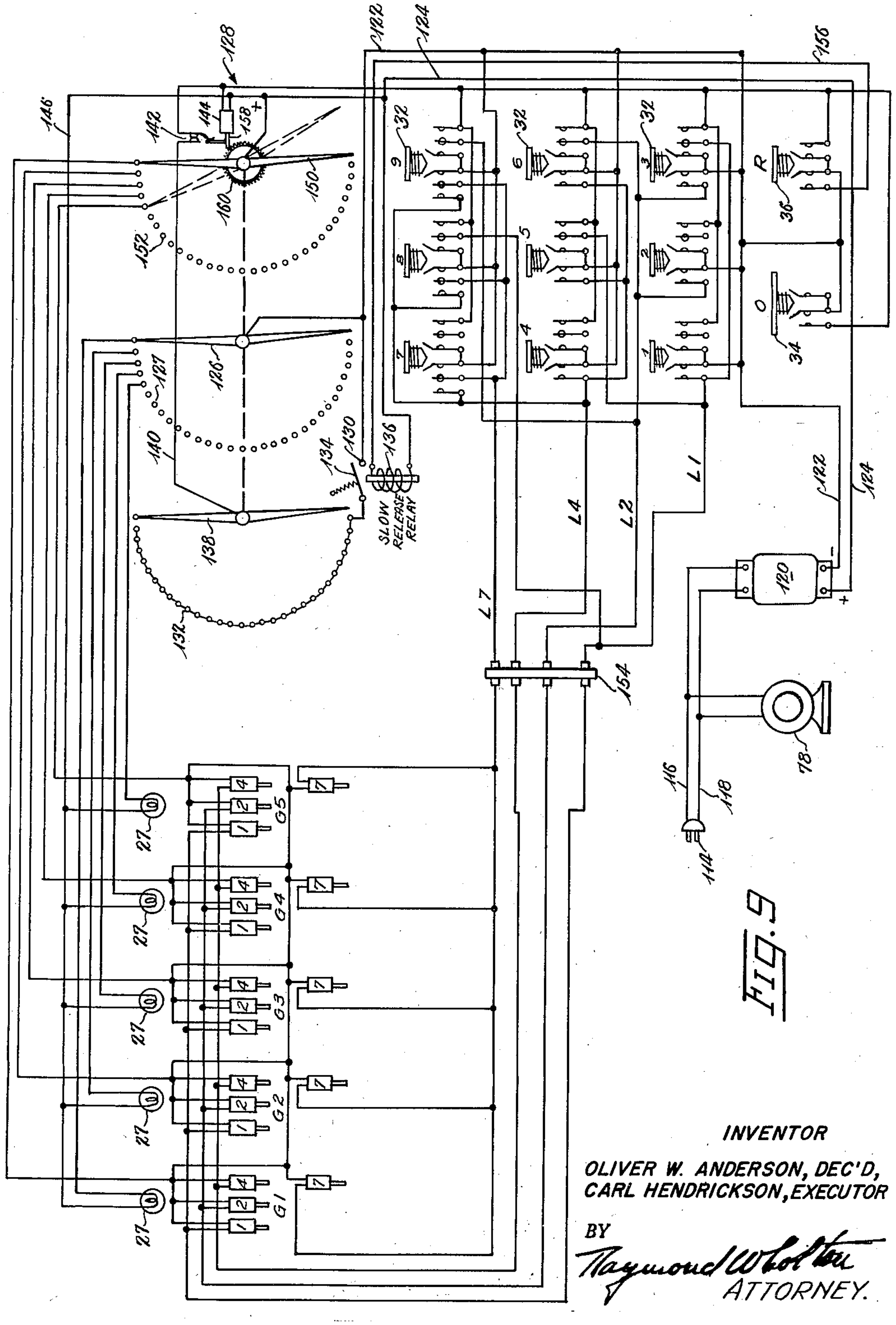
Fig. 9 is a circuit diagram depicting the operating principles of the invention.

The operation of the system will be best understood by reference to the circuit diagram of Fig. 9. The system is connected with a source of electrical energy by means of a plug 114 supplying conductors 116 and 118 to which the terminals of the motor 78 are connected and to which a transformer, voltage regulator, or the like, 120 has its input connected. The output of the device 120 is connected with supply leads 122 and 124 which have been identified in the diagram for purposes of explanation as negative and positive leads respectively, without intending to limit operation of the apparatus to direct current. Each of the numeral keys 32, as well as the zero key 34 and the return key 36, operates a switch whose central arms are connected with the lead 122. The lead 122 is also connected with the intermediate wiper 126 of one bank of contacts of a stepping switch, generally identified by reference character 128. The lead 122 is also connected to a terminal 130 for selective connection with a second bank of contacts 132 of the stepping switch 128, through a switch arm 134 operated with the armature of a slow release relay 136. The contacts 132 cooperate with a wiper 138 which is connected through a lead 140 and the terminals of a magnetically controlled switch 142, with one side of the winding of the stepping magnet 144 and with a back contact of each of the key operated switches. The other end of the winding of electromagnet 144 is connected with the lead 124, and this lead is also connected with one side of the winding of the slow release relay 136 and with a lead 146 common to the lamps 27 located behind the windows 28 which serve to indicate which group of punches is responsive to the keyboard at a given time. The lead 124 is also connected with a wiper 150 for sequentially engaging the bank of contacts 152 which determine the group of electromagnets under the control of the operating keys. It will be noted that each of the contacts 152 is connected with a lead which is common to all of the electromagnets of a group, the groups having been identified in this diagram as G1, G2, G3, G4 and G5. The return leads of the punch selecting electromagnets of the several groups having a given value are connected together, and through a terminal board 154, to the key controlled lead of corresponding value, which leads are identified as L1, L2, L4 and L7 respectively. The lead L1 is connected with one of the contacts of each switch whose key is intended to cause the operation of the "1" punch, thus including the switches of key 1, key 3, key 5 and key 8. The lead L2, in a similar way, is connected with a contact of each switch whose key is intended to cause the operation of the "2" punch, thus including the switch of each of key 2, key 3, key 6 and key 9.

The lead L4 is connected with a contact of each switch whose key calls for the operation of the "4" punch, which includes key 4, key 5 and key 6, as well as key 7, key 8 and key 9, since it will be remembered that for notching values exceeding six the punch 46 responds to the joint operation of electromagnets 102 and 104. The lead L7 is connected with contacts of the switches under the control of each of key 7, key 8 and key 9.

One of the contacts of the switch controlled by the return key 36, marked "R," is connected by means of a lead 156 with one end of the winding of the slow release relay 136.

The armature 158 of the electromagnet 144 cooperates with a ratchet wheel 160 for stepping the several wipers 126, 138 and 150 into sequential engagement with the contacts of their respective banks, the actual advancing movement being imparted by means of a spring as is customary in many commercially available stepping switches, so that the movement will occur upon release of one of the keys on the keyboard and thereby avoid such unintentional notching as might otherwise result from depressing the key for too long a period. The armature 158 also actuates the switch 142 which cooperates with the slow release relay 136 following depression of the "R" key for automatically stepping the switch 128 to its home position.

With the wipers in their initial positions as depicted in Fig. 9, and with a card positioned on the die plate of the machine, the operations might proceed as follows:

Assuming that the first position of the card is to be notched with the value "1," key 1 will be depressed, making the circuit of magnet 1 of group 1 through the wiper 150 and its first contact 152; and, indicating lamp 27 for group one will be energized through the wiper 126 and the first of its contacts 127. As long as the key 1 is held depressed, there will be no stepping of the switch 128; when the key is released however, the wipers for the various banks of contacts will be stepped one notch to the second position at which they energize the second group of punches and the second indicating lamp respectively. Following the selection of a particular punch or combination thereof by depression of a key, it will be recalled that the continuously rotating driving cams 70 will engage the actuator stops for the punches selected and notch the card accordingly. In the event that a zero value is to be indicated at any position of the card, the zero key 34 will be depressed, the closure of whose switch results only in a stepping impulse through the electromagnet 144 without causing a notching operation at this position of the card involved.

After the notching operations for a given card have been completed, the initial sequence can be restored by merely depressing and releasing the "R" key. As in the case of the other keys, operating the R key serves to energize the electromagnet 144 and it also completes the circuit of the release relay 136 so long as the wiper 138 is in engagement with any of its contacts 132 except the first one. Since the relay 136 is designed for slow release to maintain the contacts 130 and 134 in engagement for a prolonged period, it will follow that the electromagnet 144 will be repeatedly energized and deenergized through the switch 142 until the wipers of the stepping switch 128 resume their initial positions. At this time the wiper 138 will rest upon the first of its contacts 132 which is not connected with the others.

The foregoing description will suggest modifications to those skilled in the art just as the inventor himself has already recognized them, and accordingly, the construction which has been shown and described for purposes of example should not be restrictive beyond the scope of the appended claims.

What is claimed is:

1. Card edge notching apparatus comprising a card support, a plurality of groups of edge notching punches movable past said support, electromagnetic stroke changing means for a punch of each group to record different values, electromagnetic means sequentially activating said groups, means for selecting punches of said groups for a notching operation, and driving means imparting notching movement to selected punches of said groups.

2. Card edge notching apparatus comprising a card support, a plurality of groups of edge notching punches movable past said support, electromagnetic selecting means for said groups and said punches, electromagnetic stroke changing means for a punch of each group to record different values, and driving means imparting notching movement to selected punches.

3. Card edge notching apparatus comprising a card support, a plurality of groups of edge notching punches movable past said support, means sequentially activating said groups, electromagnetic selecting means for the punches in an activated group, electromagnetic stroke changing means for a punch of each group to record different values, and driving means imparting notching movement to selected punches.

4. Card edge notching apparatus comprising a card support, a plurality of groups of edge notching punches movable past said support, selecting means for said groups of punches, indicating means associated with said selecting means to identify selected groups, electromagnetic stroke changing means for a punch of each group to record different values, and driving means imparting notching movement to selected punches of said groups.

5. Card edge notching apparatus comprising a card support, a plurality of sequentially operable groups of edge notching punches movable past said support, electromagnetic stroke changing means for a punch of each group to record different values, electromagnetic means for resetting the operating sequence of said groups, means for selecting punches of said groups for a notching operation, and driving means imparting notching movement to selected punches of said groups.

6. Card edge notching apparatus comprising a card support, a plurality of groups of edge notching punches movable past said support, electromagnetic selecting means for said punches, electromagnetic stroke changing means for a punch of each group to record different values, means activating said groups in sequence, driving means imparting notching movement to selected punches, and means for resetting said sequence.

7. Card edge notching apparatus comprising a card support, a variable stroke edge notching punch movable past said support to record different values, electromagnetic stroke selecting means for said punch, and driving means imparting notching movement to said punch.

8. Card edge notching apparatus comprising a card support, a plurality of edge notching punches including a variable stroke edge notching punch movable relative to said support, a plurality of electromagnets jointly controlling the magnitude of the stroke and the selection of said punch, and driving means imparting notching movement to said punch.

9. Card edge notching apparatus comprising a card support, a group of edge notching punches movable relative towards and from a position past said support, a plurality of keys exceeding the number of punches in a group for selecting said punches, electromagnetic selecting means for said punches controlled by said keys, and driving means imparting notching movement to selected punches.

10. Card notching apparatus comprising a card support, a group of three edge notching punches for notching a card on said support to indicate values from one to nine, a keyboard containing keys representing values from one to nine in unit increments, a circuit controlling switch operated by each of said keys, electromagnetic selectors for said punches in circuit with said switches to produce a punch pattern peculiar to each key, electromagnetic means for at least one of said punches for changing its notching stroke to record different values, and driving means imparting notching movement to selected punches.

11. Card notching apparatus comprising a card support, a plurality of groups of three edge notching punches each, for notching a card on said support to indicate values from one to nine, a keyboard containing keys representing values from one to nine in unit increments, a circuit controlling switch operated by each of said keys, electromagnetic selectors for said punches in circuit with said switches to produce a punch pattern peculiar to each key, electromagnetic means for at least one of said punches for changing its notching stroke to record different values, means sequentially connecting said switches with said groups, and driving means imparting notching movement to selected punches.

12. Card notching apparatus comprising a card support, a plurality of groups of three edge notching punches each, for notching a card on said support to indicate values from one to nine, a keyboard containing keys representing values from one to nine in unit increments, a circuit controlling switch operated by each of said keys, electromagnetic selectors for said punches in circuit with said switches to produce a punch pattern peculiar to each key, electromagnetic means for at least one of said punches for changing its notching stroke to record different values, driving means imparting notching movement to selected punches, and means operated by said keys for interconnecting said switches with different groups of punches.

13. Card notching apparatus comprising a card support, a plurality of groups of three edge notching punches each, for notching a card on said support to indicate values from one to nine, a keyboard containing keys representing values from one to nine in unit increments, a circuit controlling switch operated by each of said keys, electromagnetic selectors for said punches in circuit with said switches to produce a punch pattern peculiar to each key for each of said groups in sequence, electromagnetic means for at least one of said punches for changing its notching stroke to record different values, and driving means imparting notching movement to sequential groups of selected punches.

14. Card notching apparatus comprising a card support, a plurality of groups of edge notching punches, each group being adapted to notch a card on said support to indicate values from one to nine, a keyboard containing keys representing values from one to nine in unit increments, a circuit controlling switch operated by each of said keys, electromagnetic selectors for said punches in circuit with said switches to produce a punch pattern peculiar to each key, electromagnetic means for at least one of said punches for changing its notching stroke to record different values, punch group selecting means operated by each of said keys, and driving means imparting notching movement to selected punches.

15. Card notching apparatus comprising a card support, a plurality of groups of edge notching punches for notching a card on said support to indicate values from one to nine, a keyboard containing keys representing values from one to nine in unit increments, a circuit controlling switch operated by each of said keys, electromagnetic selectors for said punches in circuit with said switches upon depression of their respective keys to produce a punch pattern peculiar to each key, electromagnetic means for at least one of said punches for changing its notching stroke to record different values, means operated upon release of said keys to connect a new group of selectors in circuit with said switches, and driving means imparting notching movement to selected punches.

16. Card notching apparatus comprising a card support, a plurality of groups of edge notching punches for notching a card on said support to indicate values from one to nine, a keyboard containing keys for selecting groups of punches and patterns of punches in a group, a circuit controlling switch operated by each of said keys, electromagnetic selectors for said punches in circuit with certain of said switches to produce a punch pattern peculiar to each key, electromagnetic means for at least one of said punches for changing its notching stroke to record different values, group selecting means connected with each of said switches, and driving means imparting notching movement to selected punches.

17. Card notching apparatus comprising a card support, a plurality of groups of edge notching punches for notching a card on said support to indicate values from one to nine, a keyboard containing a group selecting key, numeral keys and a reset key, a circuit controlling switch operated by each of said keys, electromagnetic selectors for said punches in circuit with said numeral key switches to produce a punch pattern peculiar to each key, electromagnetic means for at least one of said punches for changing its notching stroke to record different values, group changing means connected with each of said switches, and driving means imparting notching movement to selected punches.

18. Card notching apparatus comprising a card support, a plurality of groups of edge notching punches movable relative towards and from a position past said support, electromagnetic selecting means for each of said punches, electromagnetic means for at least one of said punches for changing its notching stroke to record different values, switching means common to all of said selecting means, and driving means imparting notching movement to selected punches.

19. Card notching apparatus comprising a card support, a group of edge notching punches movable relative to said support, said group comprising a punch having a variable stroke, electromagnetic stroke to record different values determining means for said punch, means for selecting punches of said groups for a notching operation, and driving means imparting notching movement to selected punches.

20. Card edge notching apparatus comprising a card support, an edge notching punch movable past said support, an actuating member having a variable throw to record different values connected with said punch, electromagnetic means for adjusting the throw of said actuating member, and means cooperating with said actuating member for driving said punch.

21. Card notching apparatus comprising a card support, a plurality of groups of edge notching punches movable past said support and arranged in a closed rectangular pattern, means for selecting punches of said groups, electromagnetic stroke changing means for a punch of each group to record different values, and driving means imparting notching movement to said selected punches.

CARL HENDRICKSON.
*Executor of the Estate of Oliver Wilbert Anderson, Deceased.*

REFERENCES CITED

The following references are of record in the file of this patent:

UNITED STATES PATENTS

| Number | Name | Date |
|---|---|---|
| 599,560 | Hedgeland | Feb. 22, 1898 |
| 1,245,500 | Peirce | Nov. 6, 1917 |
| 1,778,155 | Hildreth | Oct. 14, 1930 |
| 1,863,097 | Borel | June 14, 1932 |
| 2,062,155 | Welk et al. | Nov. 24, 1936 |
| 2,164,698 | Buckley | July 4, 1939 |
| 2,419,781 | Keefe | Apr. 29, 1947 |
| 2,521,372 | Houston | Sept. 5, 1950 |